(12) United States Patent
Shapira et al.

(10) Patent No.: US 11,574,500 B2
(45) Date of Patent: Feb. 7, 2023

(54) REAL-TIME FACIAL LANDMARK DETECTION

(71) Applicant: SAMSUNG ELECTRONICS CO., LTD., Suwon-si (KR)

(72) Inventors: Gil Shapira, Ein Carmel (IL); Noga Levy, Tel Aviv (IL); Roy Jevnisek, Giv'atayim (IL); Ishay Goldin, Dalia (IL)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 114 days.

(21) Appl. No.: 17/151,339

(22) Filed: Jan. 18, 2021

(65) Prior Publication Data

US 2022/0075994 A1 Mar. 10, 2022

Related U.S. Application Data

(60) Provisional application No. 63/075,402, filed on Sep. 8, 2020.

(51) Int. Cl.
*G06V 40/16* (2022.01)
*G06N 3/08* (2006.01)
*G06K 9/62* (2022.01)

(52) U.S. Cl.
CPC ......... *G06V 40/171* (2022.01); *G06K 9/6256* (2013.01); *G06K 9/6262* (2013.01); *G06N 3/08* (2013.01)

(58) Field of Classification Search
CPC .. G06V 40/171; G06K 9/6256; G06K 9/6262; G06N 3/08

(Continued)

(56) References Cited

U.S. PATENT DOCUMENTS

| 2014/0147023 | A1* | 5/2014 | Lee | G06V 40/172 |
| | | | | 382/118 |
| 2015/0347822 | A1* | 12/2015 | Zhou | G06V 10/454 |
| | | | | 382/118 |

(Continued)

FOREIGN PATENT DOCUMENTS

| GB | 2576784 | 3/2020 |
| WO | 2020119458 | 6/2020 |

OTHER PUBLICATIONS

Liu, et al., "Efficient Face Alignment with Fast Normalization and Contour Fitting Loss", ACM Transactions on Multimedia Computing, Communications, and Applications, Nov. 2019, Article No. 89; found on the internet: https://https://dl.acm.org/doi/10.1145/3338842, abstract.

(Continued)

*Primary Examiner* — Juan A Torres
(74) *Attorney, Agent, or Firm* — F. Chau & Associates, LLC

(57) ABSTRACT

Embodiments of the present disclosure enable and accurate detection of facial landmarks on mobile devices in real-time. An architecture of a facial landmark detection model is provided including one or more of an attention mechanism (e.g., an attention network), a graph convolution model (e.g., a two-dimensional facial geometry graph convolution model), a multiscale coarse-to-fine mechanism, a patch-facial landmark detachment mechanism, and error estimation techniques. The attention mechanism may increase the accuracy of the facial landmark detection model by attending to meaningful patches. The graph convolution network may improve patch feature aggregation by considering the facial landmarks' geometry. The coarse-to-fine mechanism reduces a network convergence to two cycles (e.g., two facial landmark detection iterations). A patch-facial landmark detachment mechanism reduces the computation burden without significant accuracy degradation. Error estima- (Continued)

tion techniques provide accurate estimation of the regression error to the computation load and increase the accuracy of the model.

20 Claims, 9 Drawing Sheets

(58) Field of Classification Search
USPC .......................................................... 382/157
See application file for complete search history.

(56) References Cited

U.S. PATENT DOCUMENTS

| | | | |
|---|---|---|---|
| 2016/0140408 A1* | 5/2016 | Shen | G06N 3/084 |
| | | | 382/157 |
| 2019/0347510 A1 | 11/2019 | Chung et al. | |
| 2020/0272806 A1* | 8/2020 | Walker | G06K 9/6271 |
| 2021/0104068 A1* | 4/2021 | Marks | G06N 3/04 |
| 2021/0158023 A1* | 5/2021 | Fu | G06V 40/165 |
| 2022/0044352 A1* | 2/2022 | Liao | G06T 3/0012 |

OTHER PUBLICATIONS

Trigeorgis, et al., "Mnemonic Descent Method: A recurrent process applied for end-to-end face alignment", 2016, 11 pages.

Su, et al., "Efficient and Accurate Face Alignment by Global Regression and Cascaded Local Refinementt", IEEE, 2019, 10 pages.

Feng, et al., "Rectified Wing Loss for Efficient and Robust Facial Landmark Localisation with Convolutional Neural Networks", International Journal of Computer Vision (2020) 128:2126-2145.

Kim, et al., "Local-Global Landmark Confidences for Face Recognition", 2017 IEEE 12th International Conference on Automatic Face & Gesture Recognition, pp. 666-672.

Steger, et al., "Failure Detection for Facial Landmark Detectors", Computer Vision Laboratory, Switzerland, 2016, 16 pages.

Fan, et al., "G2RL: Geometry-Guided Representation Learning for Facial Action Unit intensity Estimation", Proceedings of the Twenty-Ninth International Joint Conference on Artificial Intelligence (IJCAI-20), pp. 731-737, (2020).

Wei, et al., 3D Dense Face Alignment via Graph Convolution Networks:, arXiv1904.05562v1 [cs.CV] Apr. 11, 2019, pp. 4321-4329.

Ngoc, et al., "Facial Landmark-Based Emotion Recognition via Directed Graph Neural Network", Electronics 2020, 9, 764; doi10.3390electronics9050764, 13 pages.

Zhu, et al., "Fast and Accurate: Structure Coherence Component for Face Alignment", arXiv2006.11697v1 [cs.CV] Jun. 21, 2020, 18 pages.

Liu, et al., "Relation Modeling with Graph Convolutional Networks for Facial Action Unit Detection", arXiv1910.10334v1 [cs.CV] Oct. 23, 2019, 12 pages.

Hu, et al., "Facial Landmarks Detection by Self-Iterative Regression based Landmarks-Attention Network", arXiv1803.06598v1 [cs.CV] Mar. 18, 2018, 9 pages.

Liu, et al., "Extended Supervised Descent Method for Robust Face Alignment", Beijing University of Posts and Telecommunications, Beijing, China, 2014, 14 pages.

Mo, et al., "A 460 GOPS/W Improved-Mnemonic-Descent-Method-based Hardwired Accelerator for Face Alignment", IEEE 2020, found on the internet: https://ieeexplore.ieee.org/document/9091213/keywords#keywords.

* cited by examiner

Key: ○ Facial Landmark(s) 800

0.033
← 805

0.01
← 810

0.034
← 815

0.008
← 820

REAL-TIME FACIAL LANDMARK DETECTION

CROSS-REFERENCE TO RELATED APPLICATION

This application claims priority to, and the benefit of, U.S. Provisional Application Ser. No. 63/075,402 filed on Sep. 8, 2020, entitled REAL-TIME FACIAL LANDMARK DETECTION. The entire contents of the foregoing application are hereby incorporated by reference for all purposes.

BACKGROUND

The following relates generally to object detection, and more specifically to real-time facial landmark regression.

Efficient and high-performing neural network processing is becoming important on devices such as computers, smartphones, tablets, and wearables. In some examples, devices may implement specialized neural network processing to perform specialized tasks with increased processing performance and reduced power consumption. For instance, neural network processing may be implanted for various imaging and computer vision applications. Object detection systems are a part of many vision-based applications, such as surveillance cameras, autonomous driving (e.g., pedestrian avoidance applications), etc.

Neural network processing for such applications may be associated with significant computation costs, prohibiting their real-time implementation in power limited systems, systems of limited computational complexity, etc. Further, a trade-off may exist between computation costs (e.g., a number of computations over time, such as floating point operations per second (FLOPS)) and accuracy. Improved object detection techniques may be desired.

SUMMARY

A method, apparatus, non-transitory computer readable medium, and system for real-time facial landmark regression are described. Embodiments of the method, apparatus, non-transitory computer readable medium, and system are configured to generate a plurality of patches of an image, the image comprising at least a portion of a face, detect a plurality of facial landmarks by extracting patch features for each of the plurality of patches and aggregating the patch features using a graph convolution network, and process the image based on the detected plurality of facial landmarks.

An apparatus, system, and method for real-time facial landmark regression are described. Embodiments of the apparatus, system, and method are configured to an image cropping component configured to generate a plurality of patches of an image, the image comprising at least a portion of a face, a neural network configured to detect a plurality of facial landmarks by extracting patch features for each of the plurality of patches and aggregating the patch features using a graph convolution network, and a post-processing component configured to process the image based on the detected plurality of facial landmarks.

A method, apparatus, non-transitory computer readable medium, and system for real-time facial landmark regression are described. Embodiments of the method, apparatus, non-transitory computer readable medium, and system are configured to receive training images and ground truth facial landmarks for objects in the training images, predict a plurality of facial landmarks from the training images by extracting patch features for each of a plurality of images patches in the training images and aggregating the image patches using a graph convolution network, compute a loss function for a neural network based on the predicted plurality of facial landmarks, and update parameters of the neural network based on the loss function.

DETAILED DESCRIPTION

Figure 1:
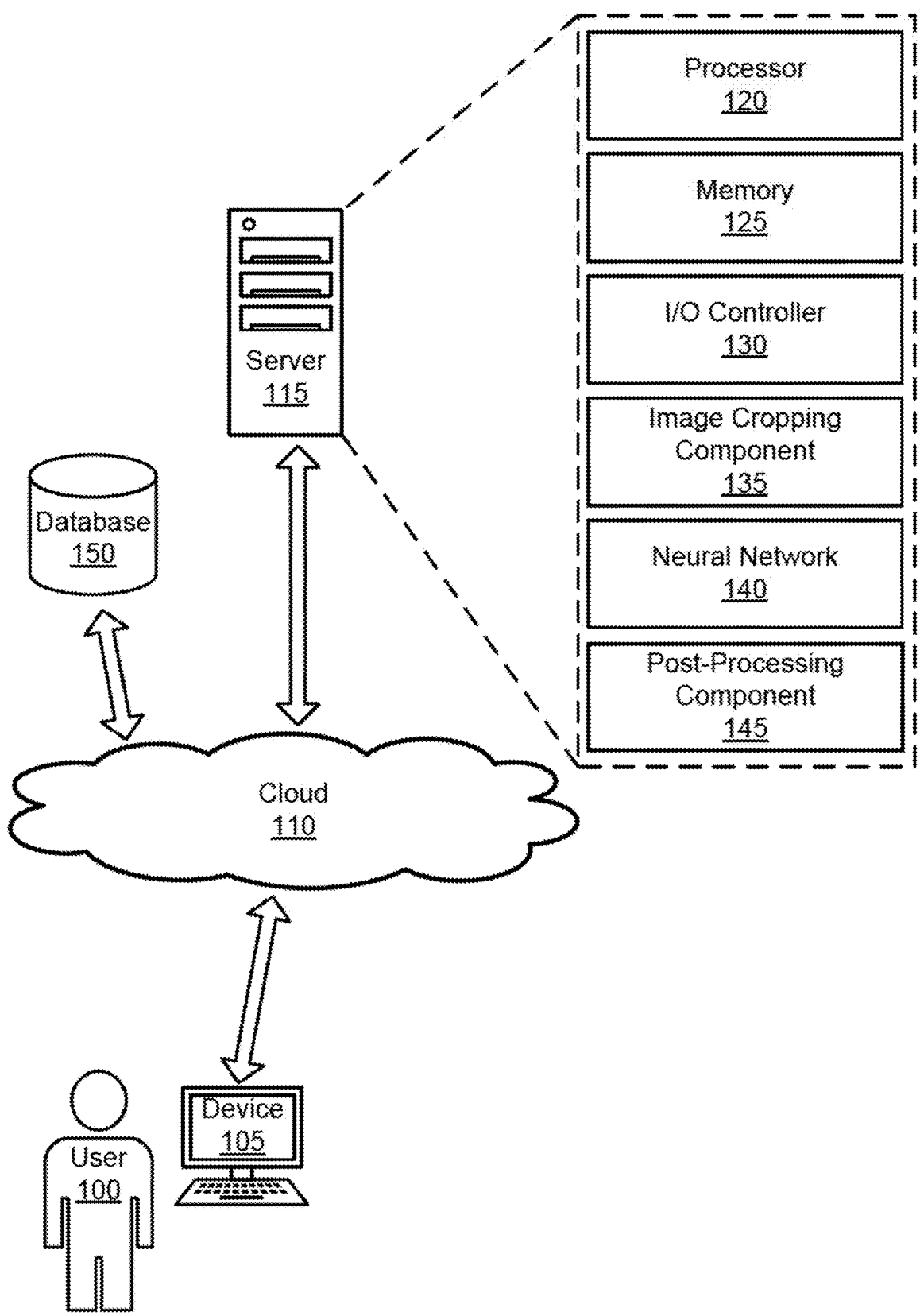
FIG. 1 shows an example of a system for object detection according to aspects of the present disclosure.

The present disclosure relates to computer vision. Embodiments of the disclosure detect facial landmarks accurately and efficiently. For example, certain embodiments detect facial landmarks using a coarse-to-fine approach based on a graph convolution network. Additionally or alternatively, embodiments may incorporate an attention mechanism, a patch-facial landmark detachment mechanism, and error estimation techniques.

Computer vision systems are used in a variety of applications including object detection, autonomous vehicles, and mobile device authentication, among other examples. For example, facial landmark detection networks identify points (i.e., landmarks) on a face corresponding specific characteristics (e.g., or facial features) such as the tip of the nose or around the eyes and mouth. Facial landmark detection is a preprocessing step for many applications such as face recognition, face beautification, facial expression detection, and avatar rendering, among other examples.

However, conventional facial landmark detection networks are computationally expensive. For example, conventional deep neural network processing models employ high computational complexity and high computation costs as measured in floating point operations per second (FLOPS). This may prevent implementation of object detector algorithms by power limited (e.g., battery-operated) devices or area-limited systems-on-chips (SOCs). As a result, these devices cannot use conventional facial landmark detection networks to identify facial landmarks in real-time, or on high-resolution images.

Embodiments of the present disclosure include an improved facial landmark detection network that detects facial landmarks accurately and efficiently. As a result, power limited and area-limited devices, such as mobile devices, may identify facial landmarks in real-time and on high-resolution images. For example, embodiments of the present disclosure perform efficiently facial landmark detection by extracting patch features of an image and aggregating the extracted patch features using a graph convolution network. The graph convolution network (e.g., a two-dimensional facial geometry graph convolution model) may improve patch feature aggregation by considering the facial landmarks' geometry.

Additionally or alternatively, embodiments of the present disclosure may include an attention mechanism (e.g., an attention network), a multiscale coarse-to-fine mechanism, a patch-facial landmark detachment mechanism, and error estimation techniques. The attention mechanism may increase the accuracy of the facial landmark detection model by attending to meaningful patches. The coarse-to-fine mechanism reduces a network convergence to two cycles (e.g., two facial landmark detection iterations through the model architecture). A patch-facial landmark detachment mechanism reduces the computation burden without significant accuracy degradation. Further, the error estimation techniques provide accurate estimation of the regression error that can be leveraged to reduce the computation load and increase the accuracy of the model.

FIG. 1 shows an example of a system for object detection according to aspects of the present disclosure. The example shown includes user 100, device 105, cloud 110, server 115, and database 150. A user 100 may use a device 105 that may be in communication with a server 115. In one embodiment, server 115 includes processor 120, memory 125, I/O controller 130, image cropping component 135, neural network 140, and post-processing component 145.

According to the techniques described herein, a system for object detection shown in FIG. 1 may be implemented for accurate, real-time object detection (e.g., facial landmark detection) at a reduced computational load (e.g., a computational load that may be processed by or used in cost-limited or power-limited devices).

Device 105 may be a personal computer, laptop computer, mainframe computer, palmtop computer, personal assistant, mobile device, or any other suitable processing apparatus. In some examples, device 105 includes or refers to a cost-limited or power-limited device. In some cases, a device 105 may include an image sensor. An image sensor may generally include any image reading device or image sensor (e.g., such as a camera or an image scanner) that may optically scan images, including such as text or photographs, and converts them to a digital image. For instance, in facial landmark detection applications, device 105 may include a mobile device or a security camera that includes an image sensor for detection of facial landmarks in an image that includes at least a portion of a face. As another example, in autonomous driving applications, device 105 may include an autonomous vehicle that may include an image sensor (e.g., an object detection camera for autonomous driving operations). As yet another example, in surveillance applications, device 105 may include a security camera that includes an image sensor for capturing surveillance images or video.

A cloud 110 may be a computer network configured to provide on-demand availability of computer system resources, such as data storage and computing power. In some examples, the cloud 110 provides resources without active management by the user 100. The term cloud 110 is sometimes used to describe data centers available to many users 100 over the Internet. Some large cloud networks have functions distributed over multiple locations from central servers. A server (e.g., server 115) is designated an edge server if it has a direct or close connection to a user 100. In some cases, a cloud 110 is limited to a single organization. In other examples, the cloud 110 is available to many organizations. In one example, a cloud 110 includes a multi-layer communications network comprising multiple edge routers and core routers. In another example, a cloud 110 is based on a local collection of switches in a single physical location.

A server 115 provides one or more functions to users 100 that are linked by way of one or more of the various networks. In some cases, the server 115 includes a single microprocessor board, which includes a microprocessor responsible for controlling all aspects of the server 115. In some cases, a server 115 uses microprocessor and protocols to exchange data with other devices 105/users 100 on one or more of the networks via hypertext transfer protocol (HTTP), and simple mail transfer protocol (SMTP), although other protocols such as file transfer protocol (FTP), and simple network management protocol (SNMP) may also be used. In some cases, a server 115 is configured to send and receive hypertext markup language (HTML) formatted files (e.g., for displaying web pages). In various embodiments, a server 115 comprises a general purpose computing device, a personal computer, a laptop computer, a mainframe computer, a super computer, or any other suitable processing apparatus.

A database 150 is an organized collection of data. For example, a database 150 stores data in a specified format known as a schema. A database 150 may be structured as a single database, a distributed database, multiple distributed databases, or an emergency backup database. In some cases, a database controller may manage data storage and processing in a database 150. In some cases, a user 100 interacts with database 150 (e.g., a database controller). In other cases, a database controller may operate automatically without user 100 interaction.

Software may include code to implement aspects of the present disclosure. Software may be stored in a non-transitory computer-readable medium such as memory 125 (e.g., system memory or other memory). In some cases, the software may not be directly executable by the processor 120 but may cause a computer (e.g., when compiled and executed) to perform functions described herein.

A processor 120 is an intelligent hardware device, (e.g., a general-purpose processing component, a digital signal processor (DSP), a CPU, a GPU, a microcontroller, an application specific integrated circuit (ASIC), a field programmable gate array (FPGA), a programmable logic device, a discrete gate or transistor logic component, a discrete hardware component, or any combination thereof). In some cases, the processor 120 is configured to operate memory 125 (e.g., a memory array) using a memory controller. In other cases, a memory controller is integrated into the processor 120. In some cases, the processor 120 is configured to execute computer-readable instructions stored in a memory 125 to perform various functions. In some embodiments, a processor 120 includes special purpose components for modem processing, baseband processing, digital signal processing, or transmission processing.

Examples of memory 125 include random access memory (RAM), read-only memory (ROM), or a hard disk. Examples of memory devices include solid state memory and a hard disk drive. In some examples, memory 125 is used to store computer-readable, computer-executable software including instructions that, when executed, cause a processor 120 to perform various functions described herein. In some cases, the memory 125 contains, among other things, a basic input/output system (BIOS) which controls basic hardware or software operation such as the interaction with peripheral components or devices. In some cases, a memory controller operates memory cells. For example, the memory controller can include a row decoder, column decoder, or both. In some cases, memory cells within a memory 125 store information in the form of a logical state.

In digital image processing and computer vision, image segmentation is the process of partitioning a digital image into multiple segments (sets of pixels, also known as image objects). The goal of segmentation is to simplify and/or change the representation of an image into something that is more meaningful and easier to analyze. Image segmentation may be used to locate objects and boundaries (lines, curves, facial landmarks, etc.) in images. In some examples, image segmentation is the process of assigning a label to every pixel in an image such that pixels with the same label share certain characteristics. In some cases, some aspects of the facial landmark detection techniques described herein may include or may be referred to as image segmentation.

Down-sampling refers to the process of reducing samples (e.g., sample-rate reduction in a multi-rate digital signal processing system). Down-sampling can include compression and filtering (i.e., decimation). It may be performed on a sequence of samples of a signal (e.g., an image), and may produce an approximation of a sequence obtained by sampling the signal at a lower rate or resolution. Compression may refer to decimation by an integer factor. For instance, decimation by a factor of 10 results in using (e.g., keeping, encoding, sampling, etc.) every tenth sample. The process of compression thus refers to the process of removing data points.

I/O controller 130 may manage input and output signals for a device. I/O controller 130 may also manage peripherals not integrated into a device. In some cases, I/O controller 130 may represent a physical connection or port to an external peripheral. In some cases, I/O controller 130 may utilize an operating system such as iOS®, ANDROID®, MS-DOS®, MS-WINDOWS®, OS/2®, UNIX®, LINUX®, or another known operating system. In other cases, I/O controller 130 may represent or interact with a modem, a keyboard, a mouse, a touchscreen, or a similar device. In some cases, I/O controller 130 may be implemented as part of a processor. In some cases, a device 105 may interact with a server 115 via I/O controller 130 or via hardware components controlled by I/O controller 130.

According to some embodiments, I/O controller 130 receives an image including one or more objects to be detected. In some examples, I/O controller 130 captures the image (e.g., using a camera, such as a security camera). That is, I/O controller 130 may include an image sensor itself or may receive an image (e.g., image data) from an image sensor that may be a part of device 105.

According to some embodiments, image cropping component 135 generates a set of patches of an image, the image including at least a portion of a face. In some examples, image cropping component 135 selects a number of cropped patches that is less than a number of the set of facial landmarks, where the set of patches of the image are generated based on the number of cropped patches. In some examples, image cropping component 135 generates a second set of patches of a high-resolution image based on the detected set of facial landmarks, where the image includes a low-resolution image. In some examples, image cropping component 135 generates a second set of patches of the image when the estimated regression error is greater than a threshold error value.

According to some embodiments, image cropping component 135 may be configured to generate a plurality of patches of an image, the image comprising at least a portion of a face. In some examples, the image cropping component 135 is configured to select a number of cropped patches that is less than a number of the set of facial landmarks, where the set of patches of the image are generated based on the number of cropped patches. In some examples, the image includes a low-resolution image and the post-processing component 145 is configured to identify patches of a high-resolution image based on the detected set of facial landmarks in the low-resolution image. In some examples, the image cropping component 135 is configured to generate a second set of patches of the image when the error term is greater than a threshold error value.

Image cropping component 135 is an example of, or includes aspects of, the corresponding element described with reference to FIG. 4.

According to some embodiments, neural network 140 estimates a regression error associated with the detected set of objects based on a loss function, where the image is processed based on the estimated regression error. In some examples, the loss function is a weighted average of a normalized Euclidean distance between a detected object and a ground truth, and an absolute difference between a predicted error and an actual error.

According to some embodiments, neural network 140 may be configured to detect a plurality of facial landmarks by extracting patch features for each of the plurality of patches and aggregating the patch features using a graph convolution network. In some examples, the neural network 140 is configured to output an error term, where the error term includes a regression error estimated by the neural network 140. In some examples, the neural network 140 aggregates the patch features based on a two dimensional facial landmark graph using the graph convolution network.

According to some embodiments, neural network 140 receives training data including image patches and ground truth information for objects in the image patches. In some examples, neural network 140 predicts a set of facial landmarks from the image patches. In some examples, neural network 140 computes a loss function for a neural network 140 based on the predicted set of facial landmarks. In some examples, neural network 140 updates parameters of the neural network 140 based on the loss function.

Neural network 140 is an example of, or includes aspects of, the corresponding element described with reference to FIG. 2.

According to some embodiments, post-processing component 145 processes the image based on the detected set of facial landmarks. In some examples, post-processing component 145 identifies coordinates of the set of facial landmarks based on the decoding, where the image is processed based on the identified coordinates of the set of facial landmarks. In some examples, post-processing component 145 performs a facial recognition computation, a facial beautification computation, a facial expression detection computation, an avatar rendering computation, or some combination thereof, based on the processed image.

According to some embodiments, post-processing component 145 may be configured to process the image based on the detected plurality of facial landmarks.

Figure 2:
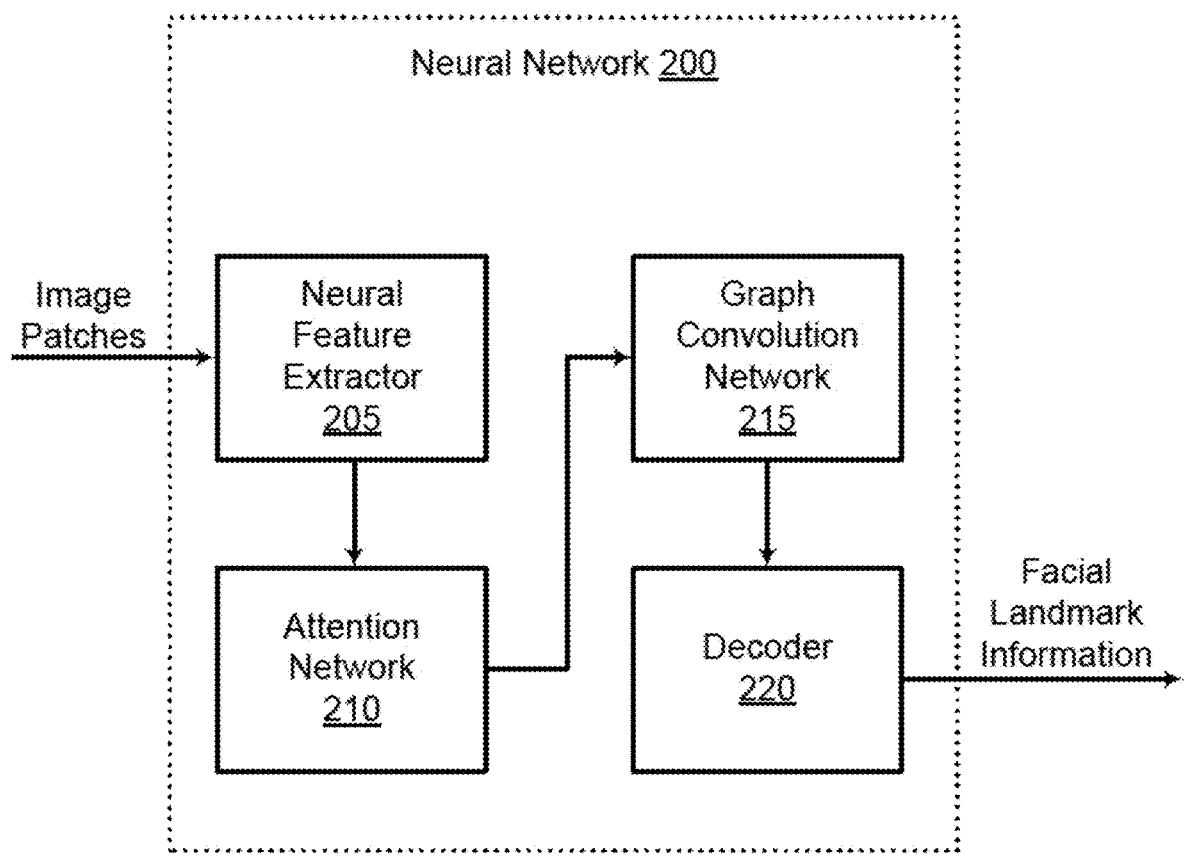
FIG. 2 shows an example of a neural network according to aspects of the present disclosure.

FIG. 2 shows an example of a neural network 200 according to aspects of the present disclosure. Neural network 200 is an example of, or includes aspects of, the corresponding element described with reference to FIG. 1. In one embodiment, neural network 200 includes neural feature extractor 205, attention network 210, graph convolution network 215, and decoder 220. Neural feature extractor 205 is an example of, or includes aspects of, the corresponding element described with reference to FIGS. 4 and 5. Attention network 210 is an example of, or includes aspects of, the corresponding element described with reference to FIG. 4. Graph convolution network 215 is an example of, or includes aspects of, the corresponding element described with reference to FIGS. 4 and 7.

Efficient and high-performing neural network processing is becoming important on devices such as computers, smartphones, tablets, and wearables. General computation units such as Computational Processor Units (CPUs), Graphical Processor Units (GPUs) and Neural Processor Units (NPUs) may perform tasks using specific hardware. A Specific Neural Processor (SNP) may be used for neural network processing, where the SNP may execute a specific network (e.g., a specific convolutional neural network (CNN), a specific artificial neural network (ANN), etc.) with high efficiency.

A neural network 200 may generate (e.g., output) facial landmark information based on input image data (e.g., based on input image patches). A neural network 200 is a type of computer algorithm that is capable of learning specific patterns without being explicitly programmed, but through iterations over known data. A neural network 200 may refer to a cognitive model that includes input nodes, hidden nodes, and output nodes. Nodes in the neural network 200 may have an activation function that computes whether the node is activated based on the output of previous nodes. Training the system (e.g., training one or more aspects of the neural network 200) may involve supplying values for the inputs, and modifying edge weights and activation functions (algorithmically or randomly) until the result closely approximates a set of desired outputs.

In some examples, neural network 200 may refer to, or may include one or more aspects of, an ANN. An ANN is a hardware or a software component that includes a number of connected nodes (i.e., artificial neurons), which loosely correspond to the neurons in a human brain. Each connection, or edge, transmits a signal from one node to another (like the physical synapses in a brain). When a node receives a signal, it processes the signal and then transmit the processed signal to other connected nodes. In some cases, the signals between nodes comprise real numbers, and the output of each node is computed by a function of the sum of its inputs. Each node and edge are associated with one or more node weights that determine how the signal is processed and transmitted. During the training process, these weights are adjusted to improve the accuracy of the result (i.e., by minimizing a loss function which corresponds in some way to the difference between the current result and the target result). The weight of an edge increases or decreases the strength of the signal transmitted between nodes. In some cases, nodes have a threshold below which a signal is not transmitted at all. In some examples, the nodes are aggregated into layers. Different layers perform different transformations on their inputs. The initial layer is known as the input layer and the last layer is known as the output layer. In some cases, signals traverse certain layers multiple times.

In some examples, neural network 200 may refer to, or may include one or more aspects of, a CNN. A CNN is a class of neural network that is commonly used in computer vision or image classification systems. In some cases, a CNN may enable processing of digital images with minimal pre-processing. A CNN may be characterized by the use of convolutional (or cross-correlational) hidden layers. These layers apply a convolution operation to the input before signaling the result to the next layer. Each convolutional node may process data for a limited field of input (i.e., the receptive field). During a forward pass of the CNN, filters at each layer may be convolved across the input volume, computing the dot product between the filter and the input. During the training process, the filters may be modified so that they activate when they detect a particular feature within the input. A standard CNN may not be suitable when the length of the output layer is variable, i.e., when the number of the objects of interest is not fixed. Selecting a large number of regions to analyze using conventional CNN techniques may result in computational inefficiencies. Thus, in the R-CNN approach, a finite number of proposed regions are selected and analyzed. In some examples, neural network 200 may refer to, or may include one or more aspects of, a R-CNN.

According to some embodiments, neural feature extractor 205 applies a feature extractor to cropped patches of the image. According to some embodiments, neural feature extractor 205 may be configured to extract patch features for each of the plurality of patches.

According to some embodiments, attention network 210 obtains weighted patch features from the cropped patches using an attention network 210, where the weighted patch features are aggregated using the graph convolution network 215. According to some embodiments, attention network 210 may be configured to obtain weighted patch features from the plurality of patches.

According to some embodiments, graph convolution network 215 detects a set of facial landmarks by extracting patch features for each of the set of patches and aggregating the patch features using a graph convolution network 215. In some examples, graph convolution network 215 aggregates the patch features based on a two dimensional facial landmark graph using the graph convolution network 215. In some examples, the two dimensional facial landmark graph includes a Delaunay Tessellation of 68 points. In some examples, graph convolution network 215 detects a second set of facial landmarks by extracting second patch features for each of the second set of patches and aggregating the second patch features using the graph convolution network 215. In some examples, graph convolution network 215 detects a second set of facial landmarks using the graph convolution network 215 on a low-resolution image, where the image includes a high-resolution image and the set of patches of the image are generated based on the detected second set of facial landmarks. According to some embodiments, graph convolution network 215 may be configured to aggregate the weighted patch features.

According to some embodiments, decoder 220 decodes the aggregated patch features. According to some embodiments, decoder 220 may be configured to decode the aggregated patch features, wherein the post-processing component processes the imaged based on the decoded aggregated patch features. For instance, decoder 220 decodes the aggregated patch features to determine (e.g., generate) facial landmark information (e.g., such as facial landmark position coordinates). The facial landmark information (e.g., the facial landmark position coordinates) may be used for various image processing operations (e.g., as further described herein, for example, with reference to operation 320 of FIG. 3). For instance, facial landmark information may include absolute or relative coordinates (e.g., a horizontal dimension along an x-axis and a vertical direction along a y-axis) of facial landmark(s). Such coordinate information may be used, for example, for facial recognition applications by comparing detected facial landmark information with predetermined facial landmark information.

Figure 3:
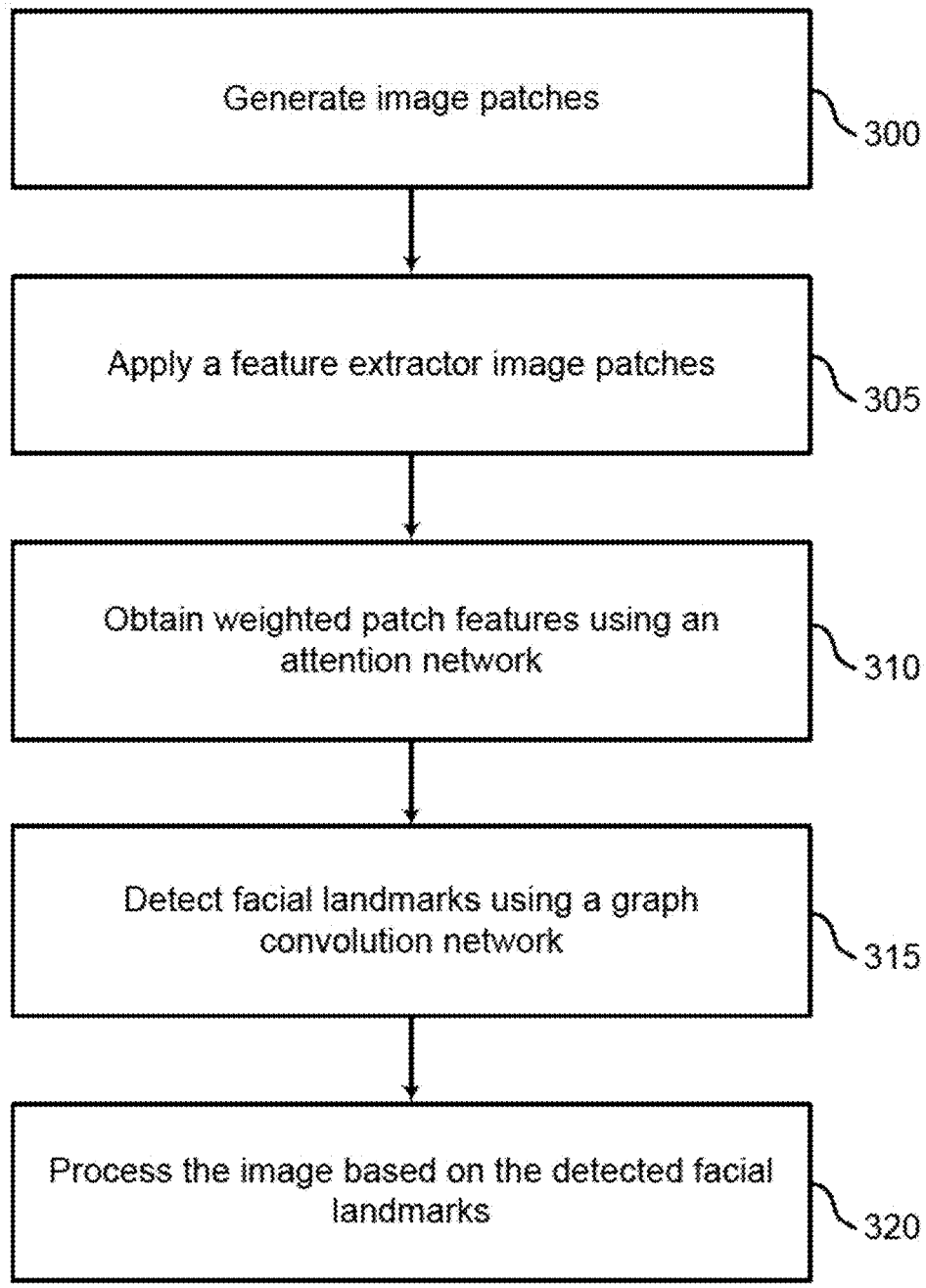
FIG. 3 shows an example of a process for real-time facial landmark regression according to aspects of the present disclosure.

FIG. 3 shows an example of a process for real-time facial landmark regression according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

At operation 300, the system generates a set of patches of an image, the image including at least a portion of a face. In some cases, the operations of this step refer to, or may be performed by, an image cropping component as described with reference to FIGS. 1 and 4.

At operation 305, the system applies a feature extractor to the patches of the image. In some cases, the operations of this step refer to, or may be performed by, a neural feature extractor as described with reference to FIGS. 2, 4, and 5.

At operation 310, the system obtains weighted patch features from the cropped patches using an attention network. In some cases, the operations of this step refer to, or may be performed by, an attention network as described with reference to FIGS. 2 and 4.

At operation 315, the system detects a set of facial landmarks using a graph convolution network. For example, a graph convolution network may extract patch features for each of the set of patches and aggregate the patch features. In some cases, the operations of this step refer to, or may be performed by, a graph convolution network as described with reference to FIGS. 2, 4, and 7.

At operation 320, the system processes the image based on the detected set of facial landmarks. For instance, the graph convolution network may generate (e.g., output) facial landmark information (e.g., coordinates of facial landmarks) based on extracting and aggregating patch features. Generally, the system may then process the image based on the detected set of facial landmarks in a variety of ways (e.g., coordinates of facial landmarks may be used for image processing applications such as facial recognition, avatar rendering, facial expression detection, etc.). For instance, human skeleton detection is an example of salient landmark detection on the human body (hands, legs, head, joints, etc.) and is similar to the facial landmark detection of a human. The present disclosure may be applied to facial landmark detection and human skeleton detection, among other examples.

Processing the image based on the detected set of facial landmarks may generally include one or more processes of inspecting, cleaning, transforming, and modeling the image data based on the detected set of facial landmarks. In some cases, image processing systems may include components for discovering useful information, collecting information, informing conclusions, and supporting decision-making. In some cases, operations 320 may refer to, or may be performed by, a post-processing component as described with reference to FIG. 1.

Figure 4:
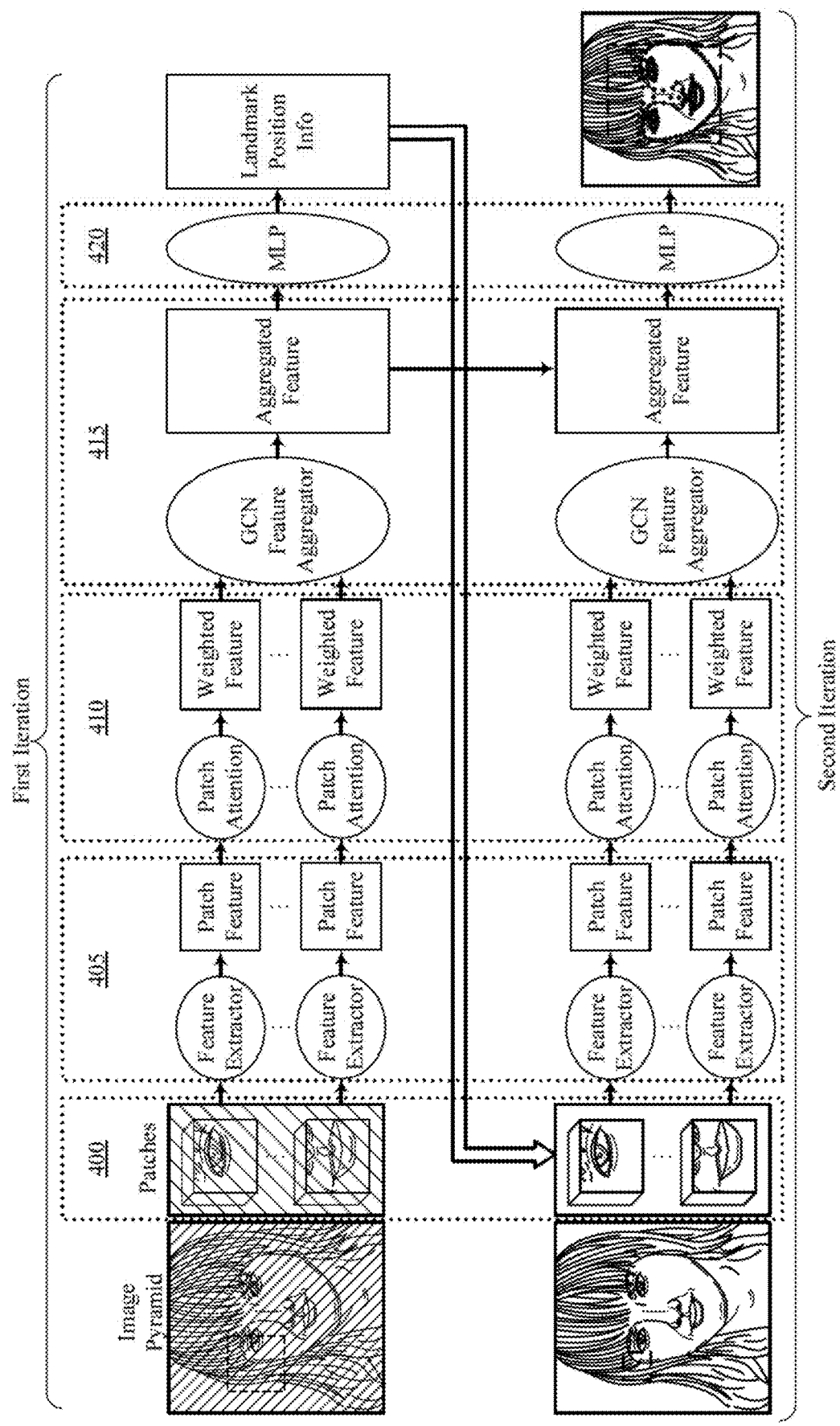
FIG. 4 shows an example of a neural network according to aspects of the present disclosure.

FIG. 4 shows an example of a neural network (e.g., a neural network architecture) according to aspects of the present disclosure. The neural network of FIG. 4 may be an example of, or may include aspects of, the corresponding element described with reference to FIGS. 1 and 2. The example shown includes image cropping component 400, neural feature extractor 405, attention network 410, graph convolution network 415, and multi-layer perceptron 420.

Image cropping component 400 is an example of, or includes aspects of, the corresponding element described with reference to FIG. 1. Neural feature extractor 405 is an example of, or includes aspects of, the corresponding element described with reference to FIGS. 2 and 5. Attention network 410 is an example of, or includes aspects of, the corresponding element described with reference to FIG. 2. Graph convolution network 415 is an example of, or includes aspects of, the corresponding element described with reference to FIGS. 2 and 7.

Before facial landmark detection (e.g., facial landmark regression calculations), a face detector (e.g., an image sensor with face detection capability) detects one or more bounding boxes around each face in the image. A facial landmark module then detects facial landmarks inside each of the one or more bounding boxes. Some facial landmark detection methods use large deep models which may not be adequate for real-time processing (e.g., some neural network computations may be too intensive for real-time processing on mobile devices). Embodiments of the present disclosure (e.g., including one or more aspects shown in FIG. 4) provide a fast, accurate, and light-weight neural network model and facilitate a high accuracy, light-weight model.

The facial landmark detection model of the present disclosure may be patched based, where the facial landmark detection model may not see (e.g., scan, process, etc.) an entire face image (e.g., or an entire bounding box determined by a face detector). Rather, the facial landmark detection model may detect cropped patches of the entire face image, reducing computation cycles. The facial landmark detection model is composed of a first and second iteration, and utilizes a coarse-to-fine mechanism. A coarse-to-fine mechanism is a method of applying a model to a low-resolution image and increasing the resolution to a finer image (e.g., a high-resolution image). In the case of the present disclosure, the facial landmark detection model is applied to a relatively low-resolution image (e.g., in a first iteration) and the resolution is then increased and the facial landmark detection model is applied to a relatively high-resolution image (e.g., in a second iteration).

The first iteration may infer a rough location and position of the face using a coarse resolution. The second iteration refines the location of the detected facial landmarks by the first iteration, using a higher resolution image. During a first iteration, the patches enter a light-weight feature extractor after the patches are cropped. The light-weight feature extractor may be a shallow CNN with two convolution layers (e.g., as described in more detail herein, for example with reference to FIG. 5). Accordingly, unlike patch-based solutions, which regress landmarks on the same scale, the present disclosure uses a coarse-to-fine approach. By starting the regression (e.g., the first iteration of the regression) with a low-resolution face image, the patches cover some or all of the face, and the facial landmark detection model of the present disclosure has enough information to infer the face location and position. The present disclosure reduces computational cycles for facial landmark detection, where the number of iterations until convergence is two iterations.

For instance, as shown in FIG. 4, the first iteration may apply the model to a low-resolution face image (e.g., with 14×14 markings of a patch). Note how the patch cover's a significant area (e.g., a relatively larger area) of the face due to the low-resolution nature of the low-resolution face image. The second iteration may apply the model to a patch from a finer resolution image (e.g., 14×14 markings of a patch from a finer resolution image). Accordingly, the patches generated by image cropping component 400 may be based on the resolution of the image. For example, the plurality of patches generated by the image cropping component 400 may be different for the first iteration and the second iteration, where the plurality of patches generated by the image cropping component 400 for the second iteration may be based on facial landmarks from the light-weight feature extractor of the first iteration (e.g., and fine facial landmark detection may be performed on the patches corresponding to coarsely detected facial landmarks).

Neural feature extractor 405 may include a light-weight feature extractor. In some examples, neural feature extractor 405 may refer to or include aspects of a shallow CNN with two convolution layers (e.g., as described in more detail herein, for example with reference to FIG. 5). Neural feature extractor 405 may apply a feature extractor to cropped patches of the image and identify patch features (e.g., features included in cropped patches) based on the feature extraction. In some cases, extracting features and identifying patch features may include identifying or locating objects and boundaries (e.g., lines, curves, edges, colors, contrast, facial landmarks, etc.) in image patches.

Attention network 410 may obtain weighted patch features from the cropped patches using an attention network. The weights for each patch feature may be obtained based on the patch features identified by neural feature extractor 405. For instance, attention network 410 may compute a weighting for each image patch according to the information each image patches contains (e.g., as further described herein, for example, with reference to FIG. 6).

Graph convolution network 415 may aggregate weighted patch features from the attention network 410. For instance, graph convolution network 415 may aggregate higher-weighted patch features based on a two dimensional graph (e.g., a two dimensional facial landmark geometry graph). For example, graph convolution network 415 may aggregate weighted image patches corresponding to facial landmarks based on a two-dimensional graph such that the weighted image patches are aggregated according to their correspondence with the two-dimensional graph (e.g., as further described herein, for example, with reference to FIG. 7).

The aggregated weighted patch features may then be passed to multi-layer perceptron 420. Multi-layer perceptron 420 is a feed forward neural network that typically consists of multiple layers of perceptrons. Each component perceptron layer may include an input layer, one or more hidden layers, and an output layer. Each node may include a nonlinear activation function. Multi-layer perceptron 420 may be trained using backpropagation (i.e., computing the gradient of the loss function with respect to the parameters). In some examples, multi-layer perceptron 420 may output facial landmark position information. As described in more detail herein, the facial landmark position information output from a first iteration (e.g., a light-weight coarse iteration applied to a relatively low-resolution version image) may be used by image cropping component 400 to generate a second plurality of patches for the second iteration (e.g., the fine iteration applied to a relatively high-resolution version of the image).

Some patched based solutions use one patch to regress each facial landmark (e.g., one patch is attached to each facial landmark). In some cases, there may be high redundancy of tightly packed patches using dense facial landmark formats. According to the techniques described herein, sparse patches may be used to reduce computation cycles. In an example scenario with 165 facial landmarks, 23 patches may be used. Using patch-facial landmark detachment techniques described herein, the facial landmark detection model of the present disclosure is much lighter, and the accuracy degradation is small (e.g., image cropping component 400 may generate a plurality of sparse patches which, in some cases, may be less than the number of facial landmarks present in an input image).

The example of FIG. 4 is shown for illustrative purposes and is not intended to limit the scope of the present disclosure. For example, in some cases, image cropping component 400, neural feature extractor 405, attention network 410, graph convolution network 415, and multi-layer perceptron 420 may be the same for both the first and second iterations. In other examples, one or more of image cropping component 400, neural feature extractor 405, attention network 410, graph convolution network 415, and multi-layer perceptron 420 may be different for the first and second iterations. That is, the neural network comprising the image cropping component 400, neural feature extractor 405, attention network 410, graph convolution network 415, and multi-layer perceptron 420 that is applied for the first iteration may be the same or different from the neural network comprising the image cropping component 400, neural feature extractor 405, attention network 410, graph convolution network 415, and multi-layer perceptron 420 that is applied for the second iteration.

Moreover, in some cases, image cropping component 400, neural feature extractor 405, attention network 410, graph convolution network 415, and multi-layer perceptron 420 may be rearranged. In some examples, additional components may be included in the neural network of FIG. 4. In some examples, one or more of the neural network comprising the image cropping component 400, neural feature extractor 405, attention network 410, graph convolution network 415, and multi-layer perceptron 420 that is applied for the first iteration may not be present in a neural network.

Figure 5:
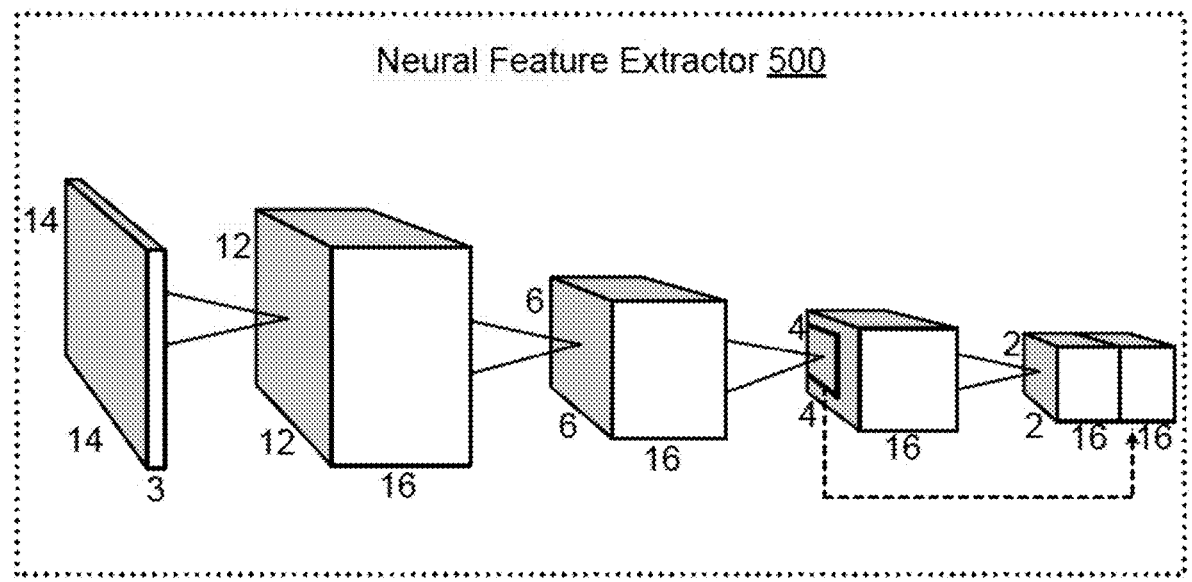
FIG. 5 shows an example of a neural feature extractor according to aspects of the present disclosure.

FIG. 5 shows an example of a neural feature extractor 500 according to aspects of the present disclosure. Neural feature extractor 500 is an example of, or includes aspects of, the corresponding element described with reference to FIGS. 2 and 4. The example neural feature extractor of FIG. 5 may include or refer to a shallow feature extractor for an image patch. For instance, FIG. 5 may illustrate aspects of extracting 2×2 features from a 14×14 image patch.

Neural feature extractor 500 may include a light-weight feature extractor. In some examples, neural feature extractor 500 may refer to or include aspects of a shallow CNN with two convolution layers. Neural feature extractor 500 may apply a feature extractor to cropped patches of an image and identify patch features (e.g., features included in cropped patches) based on the feature extraction. In some cases, extracting features and identifying patch features may include identifying or locating objects and boundaries (e.g., lines, curves, edges, colors, contrast, facial landmarks, etc.) in one or more image patches.

Figure 6:
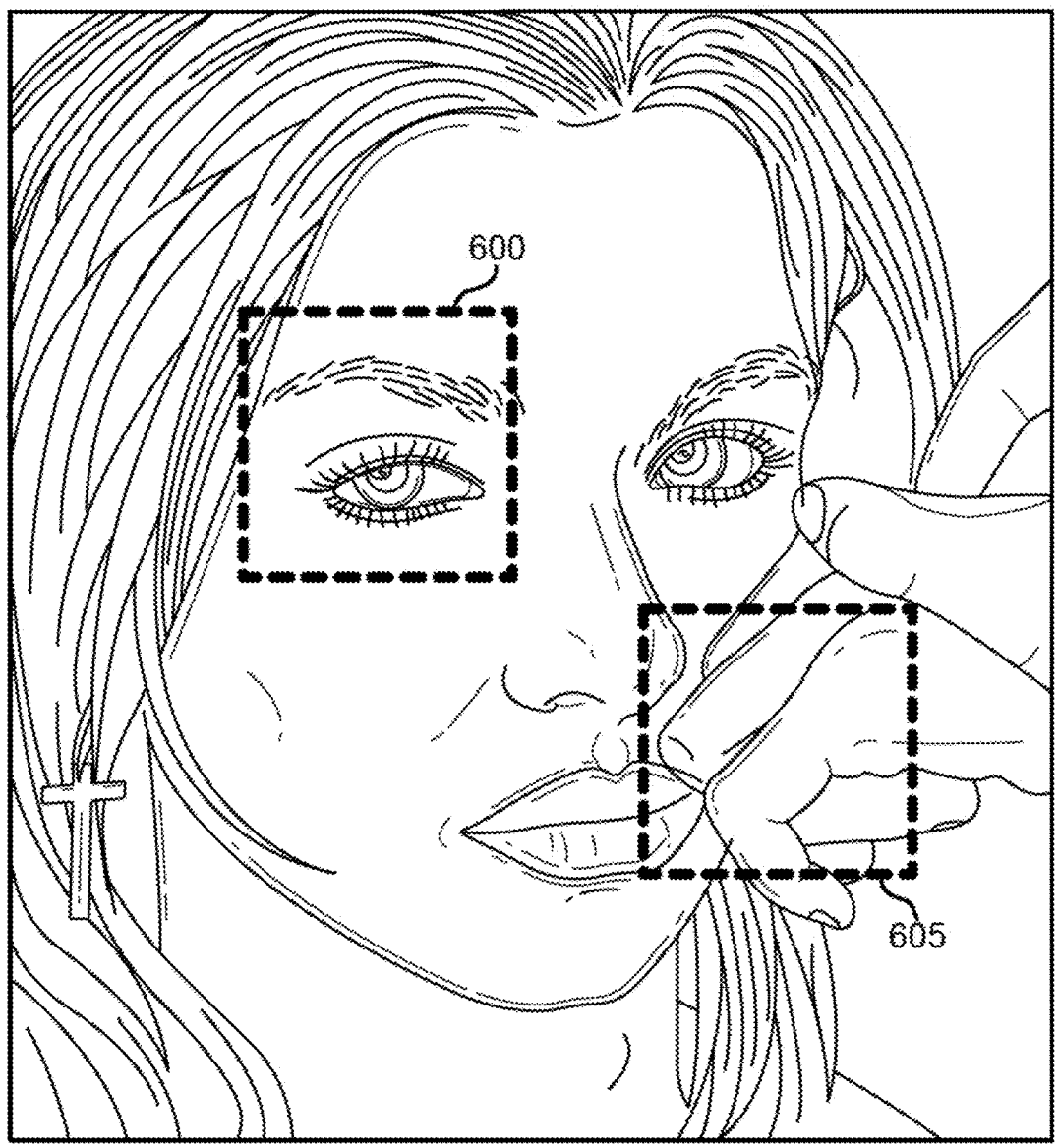
FIG. 6 shows an example of an attention mechanism according to aspects of the present disclosure.

FIG. 6 shows an example of one or more aspects of an attention mechanism applied to patches of an image according to aspects of the present disclosure. The example shown includes high-weighted patch 600 and low-weighted patch 605.

Each patch feature passes to an attention network (e.g., an attention network that is an example of, or includes aspects of, the corresponding element described with reference to FIGS. 2 and 4). The attention network computes a weighting for each patch according to the information the attention module contains. Hi-quality patches (e.g., such as high-weighted patch 600) with a clear view of a facial feature, such as an eye or mouth, receive high weights. Unclear views of facial features and patches (e.g., such as low-weighted patch 605) receive low attention (e.g., are associated with a low weight value). By using the attention network, the facial landmark detection model learns to focus on the crucial information and ignore less relevant information, which increases the facial landmark detection model's accuracy. Using the attention network, the high-weighted patch 600 will get higher weighting than the low-weighted patch 605. The attention network may be used in deep learning models for natural language processing and vision (e.g., and may be used in the facial landmark domain).

Figure 7:
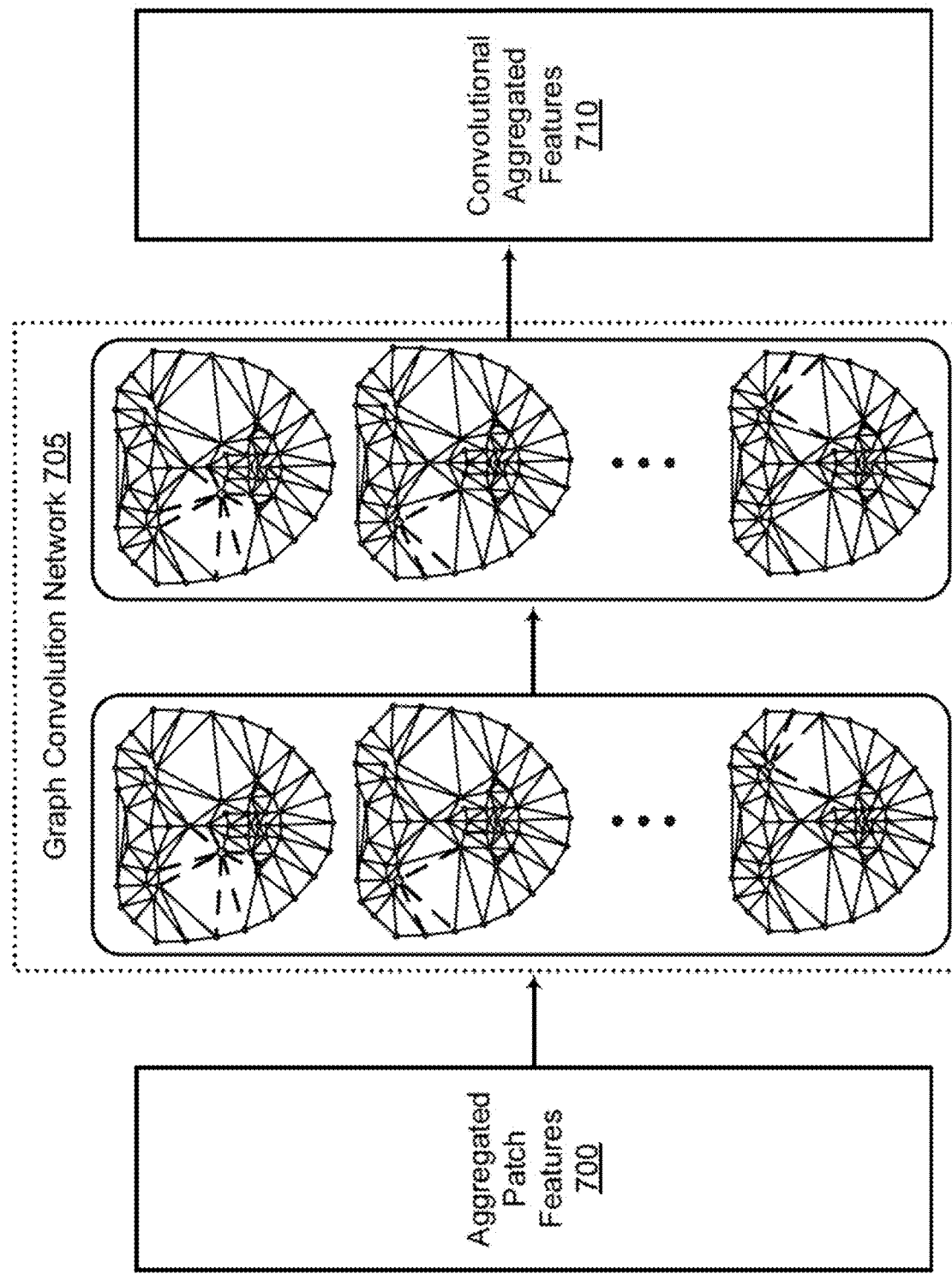
FIG. 7 shows an example of graph convolution layers for feature aggregation according to aspects of the present disclosure.

FIG. 7 shows an example of graph convolution layers for feature aggregation according to aspects of the present disclosure. The example shown includes aggregated patch features 700, graph convolution network 705, and convolutional aggregated features 710. Graph convolution network 705 is an example of, or includes aspects of, the corresponding element described with reference to FIGS. 2 and 4. A graph convolution network 705 may be applied to aggregated patch features 700 to generate convolutional aggregated features 710. In the example of FIG. 7, graph convolution network 705 includes two graph convolution layers for feature aggregation.

After each patch feature vector is weighted, the features are aggregated to one informative feature. Facial landmarks naturally induce a two-dimensional graph. Embodiments of the present disclosure convolve each facial landmark feature with a neighboring facial landmark feature on a graph. When convolving features on a graph structure, the feature of each neighbor is weighted according to a distance to a central facial landmark, resulting in an actual correlation between facial landmarks, where close facial landmarks are more correlated than far facial landmarks. The correlation dictates how to convolve the features to create feature aggregation. In some examples, the facial landmark detection model uses two graph convolutions layers and a two dimensional facial geometry graph (e.g., such as a Delaunay Tessellation of 68 points shown in FIG. 7.

Figure 8:
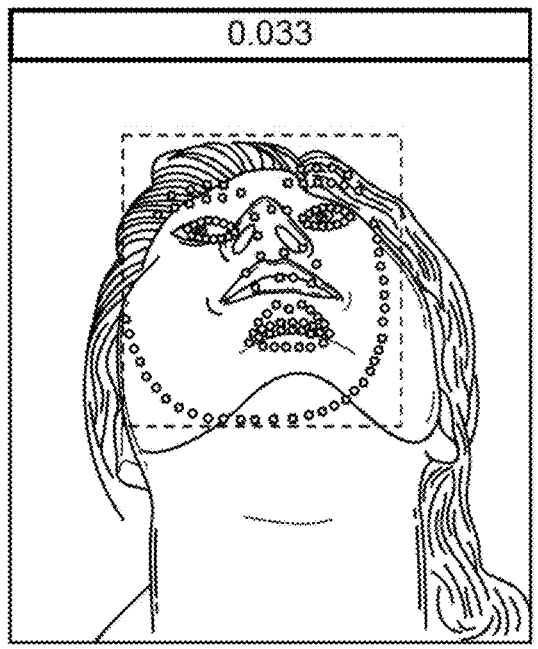
FIG. 8 shows an example of regression error estimation according to aspects of the present disclosure.
Figure 8:
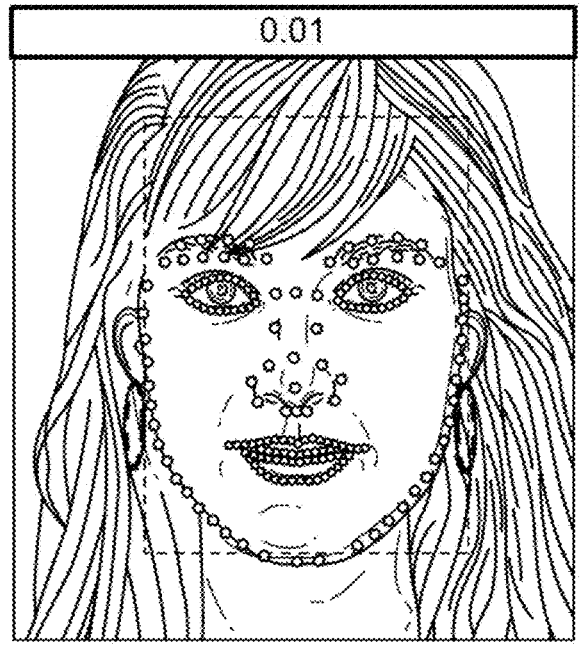
Figure 8:
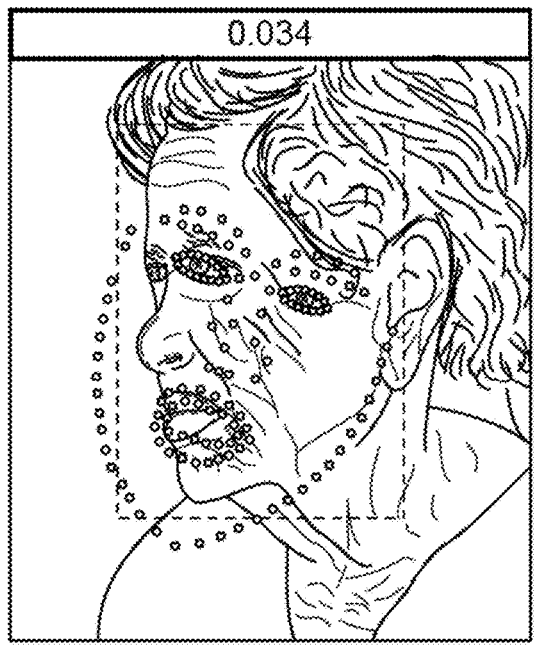
Figure 8:
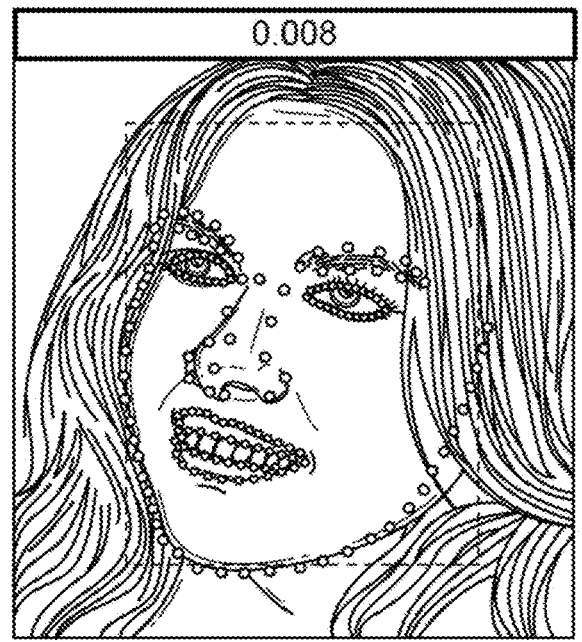

FIG. 8 shows an example of regression error estimation according to aspects of the present disclosure. For instance, FIG. 8 illustrates facial landmarks 800 detected from example images 805-820 via a neural network object detection model described herein (e.g., where the estimated error of the detection of facial landmarks 800 varies across example images 805-820).

Error estimation in the facial landmark regression system may be performed for a downstream application. If the application detects a failure in the facial landmark system, the application may use other options to fix the failure. The facial landmark detection model (e.g., a neural network model described herein, for example, with reference to FIGS. 1, 2, and 4) learns to estimate regression error by designating a neuron to determine the error. The loss function is a weighted average of the normalized Euclidean distance between the regressed landmarks and the ground truth and the absolute difference between the predicted error and the actual error. In FIG. 8, there are two failed regression instances on the left (e.g., detection of facial landmarks 800 for example images 805 and 815 may be associated with an estimated error that exceeds an error threshold). Moreover, there are two successful regression instances on the right (e.g., detection of facial landmarks 800 for example images 810 and 820 may be associated with an estimated error that is less than an error threshold). The estimated error of the failure cases (0.033 for image 805 and 0.034 for image 815) is much higher than the estimated error for the accurate regressions (0.01 for image 810 and 0.008 for image 820). As a result, the error estimator may be a discriminator between correct and erroneous regressions. The error estimation may be used to reduce computation and increase accuracy.

For example, if the estimated error is small after the first iteration (e.g., as further described herein, for example, with reference to FIG. 4), the facial landmark regression system may skip the second iteration and save half of the calculation (e.g., which may reduce latency associated with performing a new facial detection operation and new generation of image patches for a second facial landmark regression process). For instance, in some cases, inaccurate facial detection (e.g., in accurate determination of a facial bounding box) may cause facial landmark regression errors. If the estimated error after the first iteration is high, the first iteration may be used again with a different facial detection initialization. The new bounding box is computed as the bounding box of the facial landmarks after the first iteration, which provides increased localization compared to an original facial detection process, increasing the chances for an accurate regression.

Figure 9:
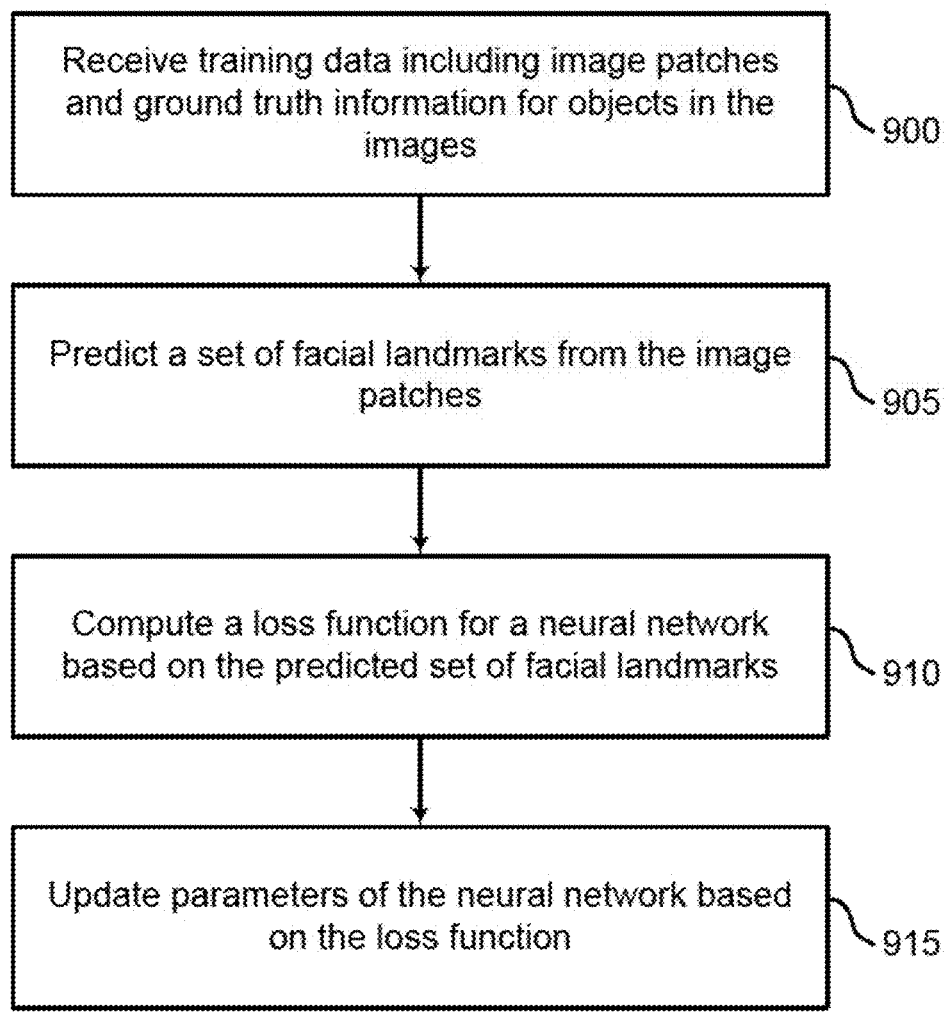
FIG. 9 shows an example of a process for real-time facial landmark regression according to aspects of the present disclosure.

FIG. 9 shows an example of a process for real-time facial landmark regression according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

Training (e.g., supervised training) refers to a method of training a machine learning model with training data that includes the "ground truth" (i.e., the "answers" to the question being posed to the system). For example, training a neural network to recognize human faces (e.g., an detected facial landmarks) might include collecting many images and manually indicating which ones include human faces and where facial landmarks are present (e.g., within a facial detection bounding box). Then the trained network can be used, for example, to identify whether images outside the training set (e.g., new images) include a human face and where facial landmarks are to be detected.

At operation 900, the system receives training data including image patches and ground truth information for objects in the image patches. In some cases, the operations of this step refer to, or may be performed by, a neural network as described with reference to FIGS. 1 and 2.

At operation 905, the system predicts a set of facial landmarks from the image patches. In some cases, the operations of this step refer to, or may be performed by, a neural network as described with reference to FIGS. 1 and 2.

At operation 910, the system computes a loss function for a neural network based on the predicted set of facial landmarks. In some cases, the operations of this step refer to, or may be performed by, a neural network as described with reference to FIGS. 1 and 2.

At operation 915, the system updates parameters of the neural network based on the loss function. In some cases, the operations of this step refer to, or may be performed by, a neural network as described with reference to FIGS. 1 and 2.

Accordingly, the present disclosure includes the following embodiments.

A method for real-time facial landmark regression is described. Embodiments of the method are configured to generating a plurality of patches of an image, the image comprising at least a portion of a face, detecting a plurality of facial landmarks by extracting patch features for each of the plurality of patches and aggregating the patch features using a graph convolution network, and processing the image based on the detected plurality of facial landmarks.

An apparatus for real-time facial landmark regression is described. The apparatus includes a processor, memory in electronic communication with the processor, and instructions stored in the memory. The instructions are operable to cause the processor to generate a plurality of patches of an image, the image comprising at least a portion of a face, detect a plurality of facial landmarks by extracting patch features for each of the plurality of patches and aggregating the patch features using a graph convolution network, and process the image based on the detected plurality of facial landmarks.

A non-transitory computer readable medium storing code for real-time facial landmark regression is described. In some examples, the code comprises instructions executable by a processor to: generate a plurality of patches of an image, the image comprising at least a portion of a face, detect a plurality of facial landmarks by extracting patch features for each of the plurality of patches and aggregating the patch features using a graph convolution network, and process the image based on the detected plurality of facial landmarks.

A system for real-time facial landmark regression is described. Embodiments of the system are configured to generating a plurality of patches of an image, the image comprising at least a portion of a face, detecting a plurality of facial landmarks by extracting patch features for each of the plurality of patches and aggregating the patch features using a graph convolution network, and processing the image based on the detected plurality of facial landmarks.

Some examples of the method, apparatus, non-transitory computer readable medium, and system described above further include applying a feature extractor to cropped patches of the image. Some examples further include obtaining weighted patch features from the cropped patches using an attention network, wherein the weighted patch features are aggregated using the graph convolution network.

Some examples of the method, apparatus, non-transitory computer readable medium, and system described above further include selecting a number of cropped patches that is less than a number of the plurality of facial landmarks, wherein the plurality of patches of the image are generated based on the number of cropped patches.

Some examples of the method, apparatus, non-transitory computer readable medium, and system described above further include decoding the aggregated patch features. Some examples further include identifying coordinates of the plurality of facial landmarks based on the decoding, wherein the image is processed based on the identified coordinates of the plurality of facial landmarks.

Some examples of the method, apparatus, non-transitory computer readable medium, and system described above further include aggregating the patch features based on a two dimensional facial landmark graph using the graph convolution network.

In some examples, the two dimensional facial landmark graph comprises a Delaunay Tessellation of 68 points.

Some examples of the method, apparatus, non-transitory computer readable medium, and system described above further include generating a second plurality of patches of a high-resolution image based on the detected plurality of facial landmarks, wherein the image comprises a low-resolution image. Some examples further include detecting a second plurality of facial landmarks by extracting second patch features for each of the second plurality of patches and aggregating the second patch features using the graph convolution network.

Some examples of the method, apparatus, non-transitory computer readable medium, and system described above further include detecting a second plurality of facial landmarks using the graph convolution network on a low-resolution image, wherein the image comprises a high-resolution image and the plurality of patches of the image are generated based on the detected second plurality of facial landmarks.

Some examples of the method, apparatus, non-transitory computer readable medium, and system described above further include estimating a regression error associated with the detected plurality of objects based on a loss function, wherein the image is processed based on the estimated regression error.

In some examples, the loss function is a weighted average of a normalized Euclidean distance between a detected object and a ground truth, and an absolute difference between a predicted error and an actual error.

Some examples of the method, apparatus, non-transitory computer readable medium, and system described above further include generating a second plurality of patches of the image when the estimated regression error is greater than a threshold error value.

Some examples of the method, apparatus, non-transitory computer readable medium, and system described above further include performing a facial recognition computation, a facial beautification computation, a facial expression detection computation, an avatar rendering computation, or some combination thereof, based on the processed image.

An apparatus for real-time facial landmark regression is described. Embodiments of the apparatus are configured to an image cropping component configured to generate a plurality of patches of an image, the image comprising at least a portion of a face, a neural network configured to detect a plurality of facial landmarks by extracting patch features for each of the plurality of patches and aggregating the patch features using a graph convolution network, and a post-processing component configured to process the image based on the detected plurality of facial landmarks.

An system for real-time facial landmark regression, comprising: an image cropping component configured to generate a plurality of patches of an image, the image comprising at least a portion of a face, a neural network configured to detect a plurality of facial landmarks by extracting patch features for each of the plurality of patches and aggregating the patch features using a graph convolution network, and a post-processing component configured to process the image based on the detected plurality of facial landmarks.

A method of manufacturing an apparatus for real-time facial landmark regression is described. The method includes manufacturing an image cropping component configured to generate a plurality of patches of an image, the image comprising at least a portion of a face, manufacturing a neural network configured to detect a plurality of facial landmarks by extracting patch features for each of the plurality of patches and aggregating the patch features using a graph convolution network, and manufacturing a post-processing component configured to process the image based on the detected plurality of facial landmarks.

A method of using an apparatus for real-time facial landmark regression is described. The method includes an image cropping component configured to generate a plurality of patches of an image, the image comprising at least a portion of a face, a neural network configured to detect a plurality of facial landmarks by extracting patch features for each of the plurality of patches and aggregating the patch features using a graph convolution network, and a post-processing component configured to process the image based on the detected plurality of facial landmarks.

Some examples of the apparatus, system, and method described above further include a neural feature extractor configured to extract patch features for each of the plurality of patches. Some examples further include an attention network configured to obtain weighted patch features from the plurality of patches. Some examples further include a graph convolution network configured to aggregate the weighted patch features. Some examples further include a decoder configured to decode the aggregated patch features, wherein the post-processing component processes the imaged based on the decoded aggregated patch features.

In some examples, the image cropping component is configured to select a number of cropped patches that is less than a number of the plurality of facial landmarks, wherein the plurality of patches of the image are generated based on the number of cropped patches.

In some examples, the image comprises a low-resolution image and the post-processing component is configured to identify patches of a high-resolution image based on the detected plurality of facial landmarks in the low-resolution image.

In some examples, the neural network is configured to output an error term, wherein the error term comprises a regression error estimated by the neural network.

In some examples, the image cropping component is configured to generate a second plurality of patches of the image when the error term is greater than a threshold error value.

In some examples, the neural network aggregates the patch features based on a two dimensional facial landmark graph using the graph convolution network.

A method for real-time facial landmark regression is described. Embodiments of the method are configured to receive training images and ground truth facial landmarks for objects in the training images, predict a plurality of facial landmarks from the training images by extracting patch features for each of a plurality of images patches in the training images and aggregating the image patches using a graph convolution network, compute a loss function for a neural network based on the predicted plurality of facial landmarks, and update parameters of the neural network based on the loss function.

An apparatus for real-time facial landmark regression is described. The apparatus includes a processor, memory in electronic communication with the processor, and instructions stored in the memory. The instructions are operable to cause the processor to receive training data comprising training images and ground truth facial landmarks for objects in the training images, predict a plurality of facial landmarks from the training images by extracting patch features for each of a plurality of images patches in the training images and aggregating the image patches using a graph convolution network, compute a loss function for a neural network based on the predicted plurality of facial landmarks, and update parameters of the neural network based on the loss function.

A non-transitory computer readable medium storing code for real-time facial landmark regression is described. In some examples, the code comprises instructions executable by a processor to: receive training data comprising training images and ground truth facial landmarks for objects in the training images, predict a plurality of facial landmarks from the training images by extracting patch features for each of a plurality of images patches in the training images and aggregating the image patches using a graph convolution network, compute a loss function for a neural network based on the predicted plurality of facial landmarks, and update parameters of the neural network based on the loss function.

A system for real-time facial landmark regression is described. Embodiments of the system are configured to receiving training data comprising training images and ground truth facial landmarks for objects in the training images, predicting a plurality of facial landmarks from the training images by extracting patch features for each of a plurality of images patches in the training images and aggregating the image patches using a graph convolution network, computing a loss function for a neural network based on the predicted plurality of facial landmarks, and updating parameters of the neural network based on the loss function.

In some examples, computing the loss function includes computing the loss function as a weighted average of a normalized Euclidean distance between the predicted plurality of facial landmarks and the ground truth facial landmarks.

The description and drawings described herein represent example configurations and do not represent all the implementations within the scope of the claims. For example, the operations and steps may be rearranged, combined, or otherwise modified. Also, structures and devices may be represented in the form of block diagrams to represent the relationship between components and avoid obscuring the described concepts. Similar components or features may have the same name but may have different reference numbers corresponding to different figures.

Some modifications to the disclosure may be readily apparent to those skilled in the art, and the principles defined herein may be applied to other variations without departing from the scope of the disclosure. Thus, the disclosure is not limited to the examples and designs described herein, but is to be accorded the broadest scope consistent with the principles and novel features disclosed herein.

The described methods may be implemented or performed by devices that include a general-purpose processor, a DSP, an ASIC, a FPGA or other programmable logic device, discrete gate or transistor logic, discrete hardware components, or any combination thereof. A general-purpose processor may be a microprocessor, a conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration). Thus, the functions described herein may be implemented in hardware or software and may be executed by a processor, firmware, or any combination thereof. If implemented in software executed by a processor, the functions may be stored in the form of instructions or code on a computer-readable medium.

Computer-readable media includes both non-transitory computer storage media and communication media including any medium that facilitates transfer of code or data. A non-transitory storage medium may be any available medium that can be accessed by a computer. For example, non-transitory computer-readable media can comprise RAM, ROM, electrically erasable programmable read-only memory (EEPROM), compact disk (CD) or other optical disk storage, magnetic disk storage, or any other non-transitory medium for carrying or storing data or code.

Also, connecting components may be properly termed computer-readable media. For example, if code or data is transmitted from a website, server, or other remote source using a coaxial cable, fiber optic cable, twisted pair, digital subscriber line (DSL), or wireless technology such as infrared, radio, or microwave signals, then the coaxial cable, fiber optic cable, twisted pair, DSL, or wireless technology are included in the definition of medium. Combinations of media are also included within the scope of computer-readable media.

In this disclosure and the following claims, the word "or" indicates an inclusive list such that, for example, the list of X, Y, or Z means X or Y or Z or XY or XZ or YZ or XYZ. Also the phrase "based on" is not used to represent a closed set of conditions. For example, a step that is described as "based on condition A" may be based on both condition A and condition B. In other words, the phrase "based on" shall be construed to mean "based at least in part on." Also, the words "a" or "an" indicate "at least one."

What is claimed is:

1. A method for object detection, comprising:
generating a plurality of patches of an image, the image comprising at least a portion of a face;
detecting a plurality of facial landmarks by extracting patch features for each of the plurality of patches and aggregating the patch features using a graph convolution network; and
processing the image based on the detected plurality of facial landmarks.

2. The method of claim 1, further comprising:
applying a feature extractor to cropped patches of the image; and
obtaining weighted patch features from the cropped patches using an attention network, wherein the weighted patch features are aggregated using the graph convolution network.

3. The method of claim 2, further comprising:
selecting a number of cropped patches that is less than a number of the plurality of facial landmarks, wherein the plurality of patches of the image are generated based on the number of cropped patches.

4. The method of claim 1, further comprising:
decoding the aggregated patch features; and
identifying coordinates of the plurality of facial landmarks based on the decoding, wherein the image is processed based on the identified coordinates of the plurality of facial landmarks.

5. The method of claim 1, further comprising:
aggregating the patch features based on a two dimensional facial landmark graph using the graph convolution network.

6. The method of claim 5, wherein:
the two dimensional facial landmark graph comprises a Delaunay Tessellation of 68 points.

7. The method of claim 1, further comprising:
generating a second plurality of patches of a high-resolution image based on the detected plurality of facial landmarks, wherein the image comprises a low-resolution image; and
detecting a second plurality of facial landmarks by extracting second patch features for each of the second plurality of patches and aggregating the second patch features using the graph convolution network.

8. The method of claim 1, further comprising:
detecting a second plurality of facial landmarks using the graph convolution network on a low-resolution image, wherein the image comprises a high-resolution image and the plurality of patches of the image are generated based on the detected second plurality of facial landmarks.

9. The method of claim 1, further comprising:
estimating a regression error associated with the detected plurality of objects based on a loss function, wherein the image is processed based on the estimated regression error.

10. The method of claim 9, further comprising:
generating a second plurality of patches of the image when the estimated regression error is greater than a threshold error value.

11. The method of claim 1, further comprising:
performing a facial recognition computation, a facial beautification computation, a facial expression detection computation, an avatar rendering computation, or some combination thereof, based on the processed image.

12. An apparatus for object detection, comprising:
a neural feature extractor configured to extract patch features for each of a plurality of patches of an image, the image comprising at least a portion of a face;
an attention network configured to obtain weighted patch features from the plurality of patches based on the extracted patch features;
a graph convolution network configured to aggregate the weighted patch features; and
a decoder configured to decode the aggregated patch features and detect a plurality of facial landmarks, wherein a post-processing component processes the image based on the decoded aggregated patch features.

13. The apparatus of claim 12, further comprising:
an image cropping component configured to generate the plurality of patches of the image; and
a post-processing component configured to process the image based on the detected plurality of facial landmarks.

14. The apparatus of claim 13, wherein:
the image cropping component is configured to select a number of cropped patches that is less than a number of the plurality of facial landmarks, wherein the plurality of patches of the image are generated based on the number of cropped patches.

15. The apparatus of claim 13, wherein:
the image comprises a low-resolution image and the post-processing component is configured to identify patches of a high-resolution image based on the detected plurality of facial landmarks in the low-resolution image.

16. The apparatus of claim 13, wherein:
the image cropping component is configured to generate a second plurality of patches of the image when an error term is greater than a threshold error value.

17. The apparatus of claim 12, wherein:
the decoder is configured to output an error term, wherein the error term comprises a regression error estimated by a neural network.

18. The apparatus of claim 12, wherein:
the graph convolution network aggregates the patch features based on a two dimensional facial landmark graph.

19. A method for object detection, comprising:
receiving training data comprising training images and ground truth facial landmarks for objects in the training images;
predicting a plurality of facial landmarks from the training images by extracting patch features for each of a plurality of images patches in the training images and aggregating the images patches using a graph convolution network;
computing a loss function for a neural network based on the predicted plurality of facial landmarks; and
updating parameters of the neural network based on the loss function.

20. The method of claim 19, wherein computing the loss function further comprises:
computing the loss function as a weighted average of a normalized Euclidean distance between the predicted plurality of facial landmarks and the ground truth facial landmarks.

* * * * *